US011333117B2

(12) United States Patent
Hussain (10) Patent No.: US 11,333,117 B2
(45) Date of Patent: May 17, 2022

(54) FUEL FILTER ASSEMBLY

(71) Applicant: CHAMPION LABORATORIES, INC., Albion, IL (US)

(72) Inventor: Zafar Hussain, Albion, IL (US)

(73) Assignee: CHAMPION LABORATORIES, INC., Albion, IL (US)

( * ) Notice: Subject to any disclaimer, the term of this patent is extended or adjusted under 35 U.S.C. 154(b) by 66 days.

(21) Appl. No.: 16/742,605

(22) Filed: Jan. 14, 2020

(65) Prior Publication Data
US 2020/0224618 A1 Jul. 16, 2020

Related U.S. Application Data

(60) Provisional application No. 62/792,176, filed on Jan. 14, 2019.

(51) Int. Cl.
*F02M 37/32* (2019.01)
*B01D 35/30* (2006.01)
*F02M 37/00* (2006.01)
*B01D 36/00* (2006.01)

(52) U.S. Cl.
CPC ............. *F02M 37/32* (2019.01); *B01D 35/30* (2013.01); *B01D 36/003* (2013.01); *F02M 37/0017* (2013.01); *B01D 2201/291* (2013.01)

(58) Field of Classification Search
CPC .. F02M 37/32; F02M 37/0017; B01D 36/003; B01D 35/30; B01D 2201/291; B01D 27/005; B01D 2201/295; B01D 27/00; B01D 29/00; B01D 35/306; B01D 2201/301; B01D 2201/34; B01D 2201/4046; B01D 2201/4061
USPC ................ 210/348, 440–444, 450, 452, 456, 210/DIG. 17
See application file for complete search history.

(56) References Cited

U.S. PATENT DOCUMENTS

2010/0126928 A1* 5/2010 South .................... F02M 37/32
210/440

* cited by examiner

*Primary Examiner* — Madeline Gonzalez
(74) *Attorney, Agent, or Firm* — Bryan Cave Leighton Paisner LLP (57) ABSTRACT

A fluid filter assembly is adapted to filter out contaminants from a fluid supply. The filter assembly includes a housing that is adapted to house a cylindrical filter element. The housing includes a lower housing and an upper housing. A top plate is secured to the upper filter housing. Both the top plate and upper filter housing include seals that are adapted to seal the filter. The filter includes threads formed on an exterior surface of the upper housing to allow the filter to be coupled to a filter mount. Dirty fuel enters the filter through the top plate by use of a plurality of openings formed in the top plate, passes through media of the filter element, and exits through a center opening formed in the top plate.

20 Claims, 8 Drawing Sheets

FUEL FILTER ASSEMBLY

CLAIM FOR PRIORITY

This application claims priority under 35 U.S.C. § 119(e) to U.S. Provisional Application Ser. No. 62/792,176, filed Jan. 14, 2019, which is expressly incorporated by reference herein.

FIELD OF THE DISCLOSURE

The present disclosure relates generally to filter devices for an internal combustion engine of a motor vehicle.

BACKGROUND

The present disclosure relates generally to filters and more particularly to fuel filters that are used to remove contaminants from fuel before being used by an internal combustion engine.

Filters, in particular fuel filters, are commonly used in modern motor vehicles and serve to clean the fuel to remove unwanted containments that can cause damage to the fuel system of the vehicle.

SUMMARY

The present disclosure may comprise one or more of the following features and combinations thereof.

In illustrative embodiments, a fluid filter assembly is adapted to filter out contaminants from a fluid supply. The filter assembly includes a housing that is adapted to house a cylindrical filter element. The housing includes a lower housing and an upper housing. The upper and lower housings are bonded together to form the housing that contains the filter element.

In illustrative embodiments, a top plate is secured to the upper filter housing. Both the top plate and upper filter housing include seals that are adapted to seal the filter. The filter includes threads formed on an exterior surface of the upper housing to allow the filter to be coupled to a filter mount. Dirty fuel enters the filter through the top plate by use of a plurality of openings formed in the top plate, passes through media of the filter element, and exits through a center opening formed in the top plate.

These and other features of the present disclosure will become more apparent from the following description of the illustrative embodiments.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
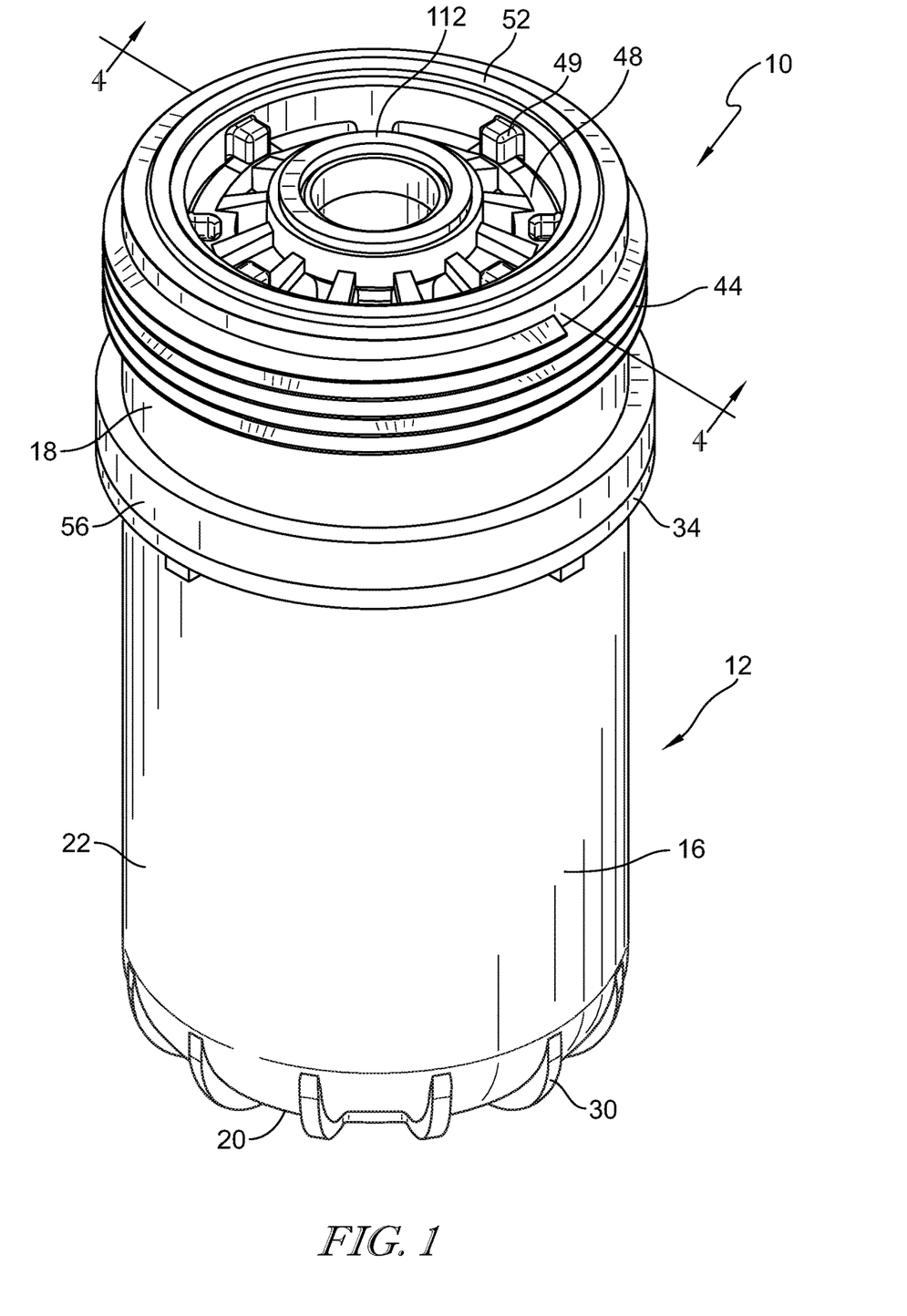
FIG. 1 is an upper perspective view of a filter assembly.

This disclosure describes a fluid filter assembly 10 that is adapted to filter out contaminants from a fluid supply, as shown in FIG. 1. The filter assembly 10 includes a housing 12 that is adapted to house a cylindrical filter element 14, as shown in FIG. 4.

Housing 12 includes a lower housing 16 and an upper housing 18. Upper and lower housings, 18, 16 are bonded together to contain filter element 14, as shown, for example, in FIG. 3. A top plate 48 is secured to the upper filter housing 18. Both top plate 48 and upper filter housing 18 include seals 52, 112 that are adapted to seal the filter 10 to a filter mount (not shown). Filter 10 includes threads 44 formed on an exterior side of the upper housing 18 to allow the filter 10 to be secured to the filter housing.

Figure 2:
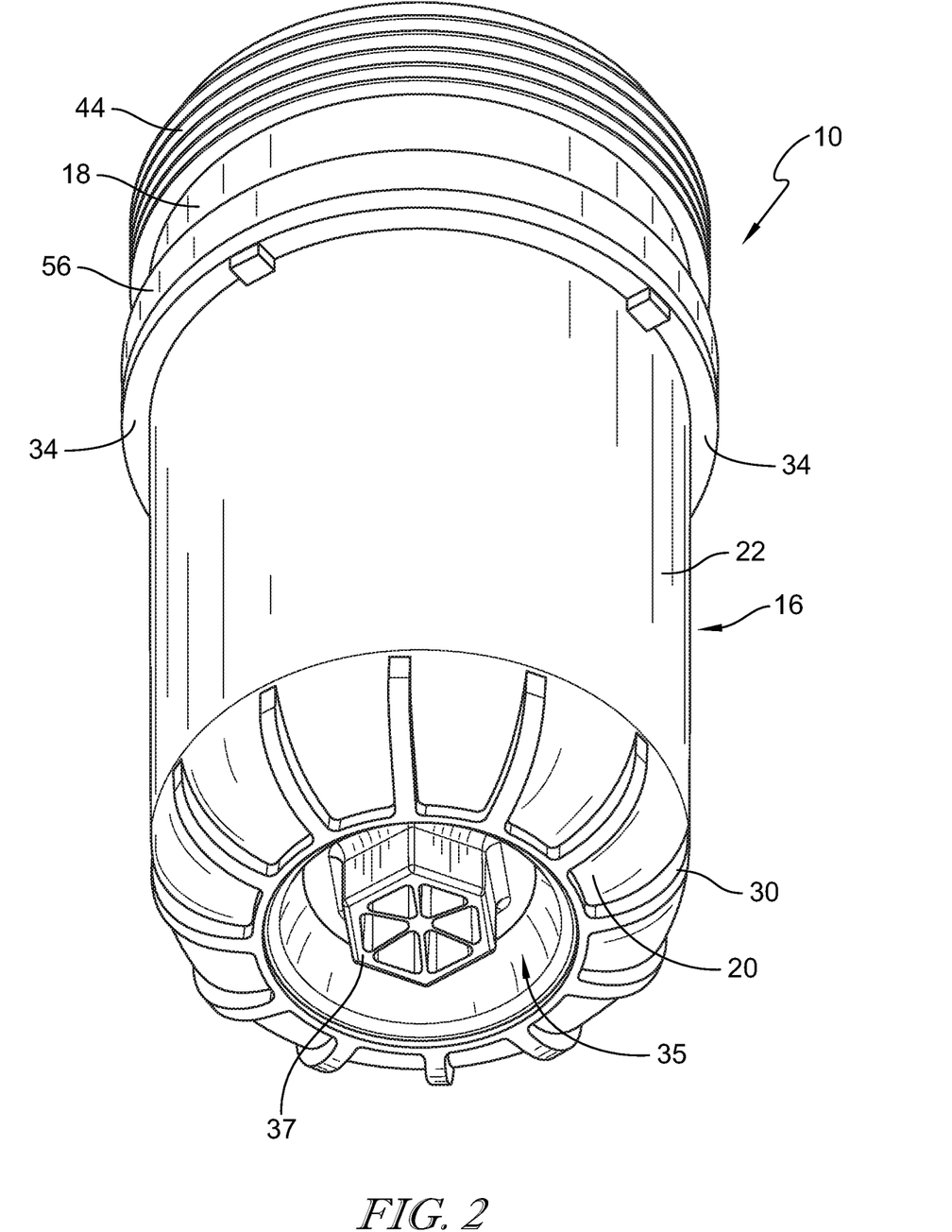
FIG. 2 is a lower perspective view of the filter assembly.
Figure 3:
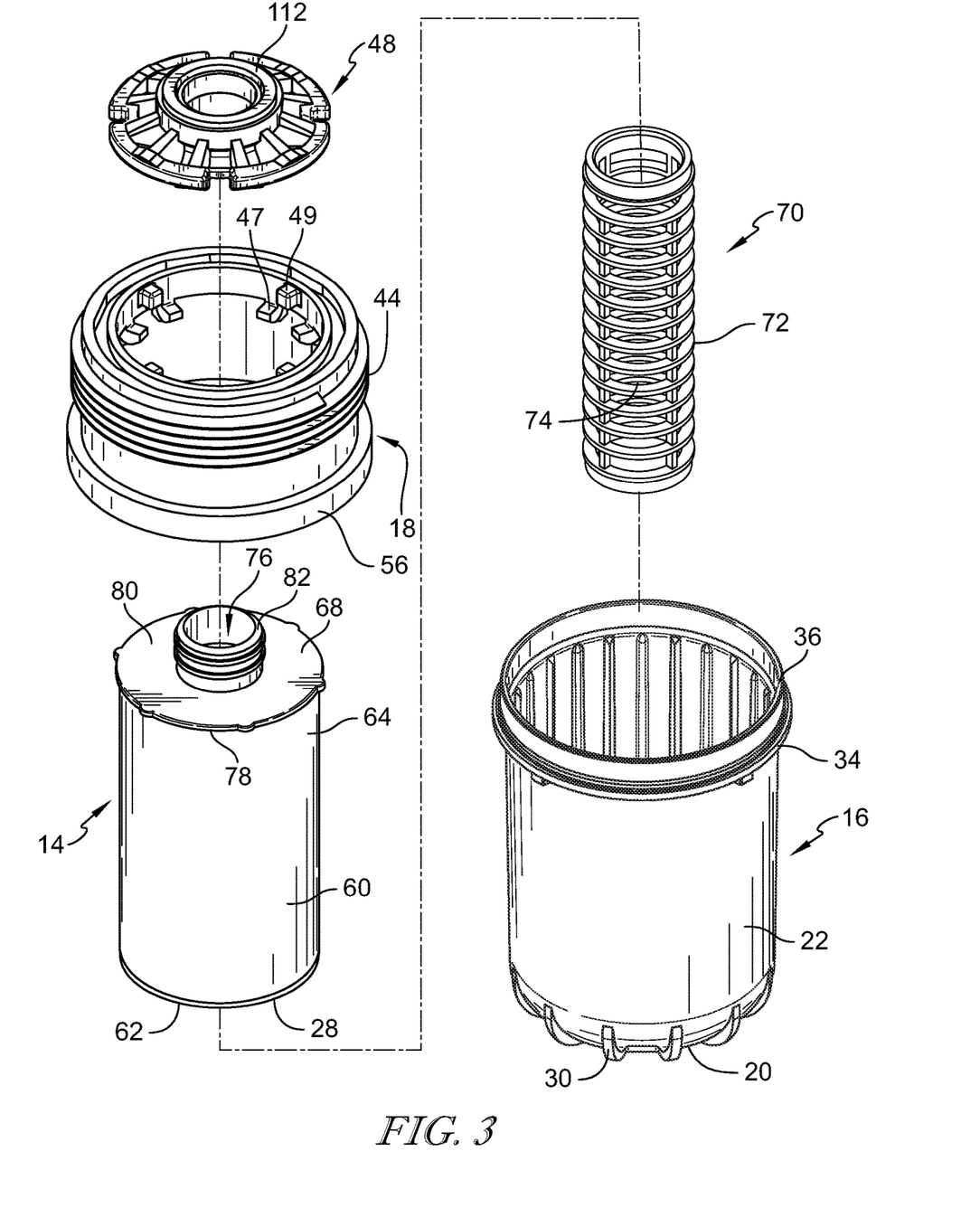
FIG. 3 is an exploded view of the filter assembly.

Lower housing 16 includes a bottom wall 20 and a side wall 22 that depends from the bottom wall 20, as shown, for example in FIGS. 2 and 3. Side wall 22 and bottom wall 20 together form a cavity 23 that is adapted to accept a portion of filter element 14. Bottom wall 20 of lower housing 16 includes a central projection 24, as shown in FIG. 4.

Figure 4:
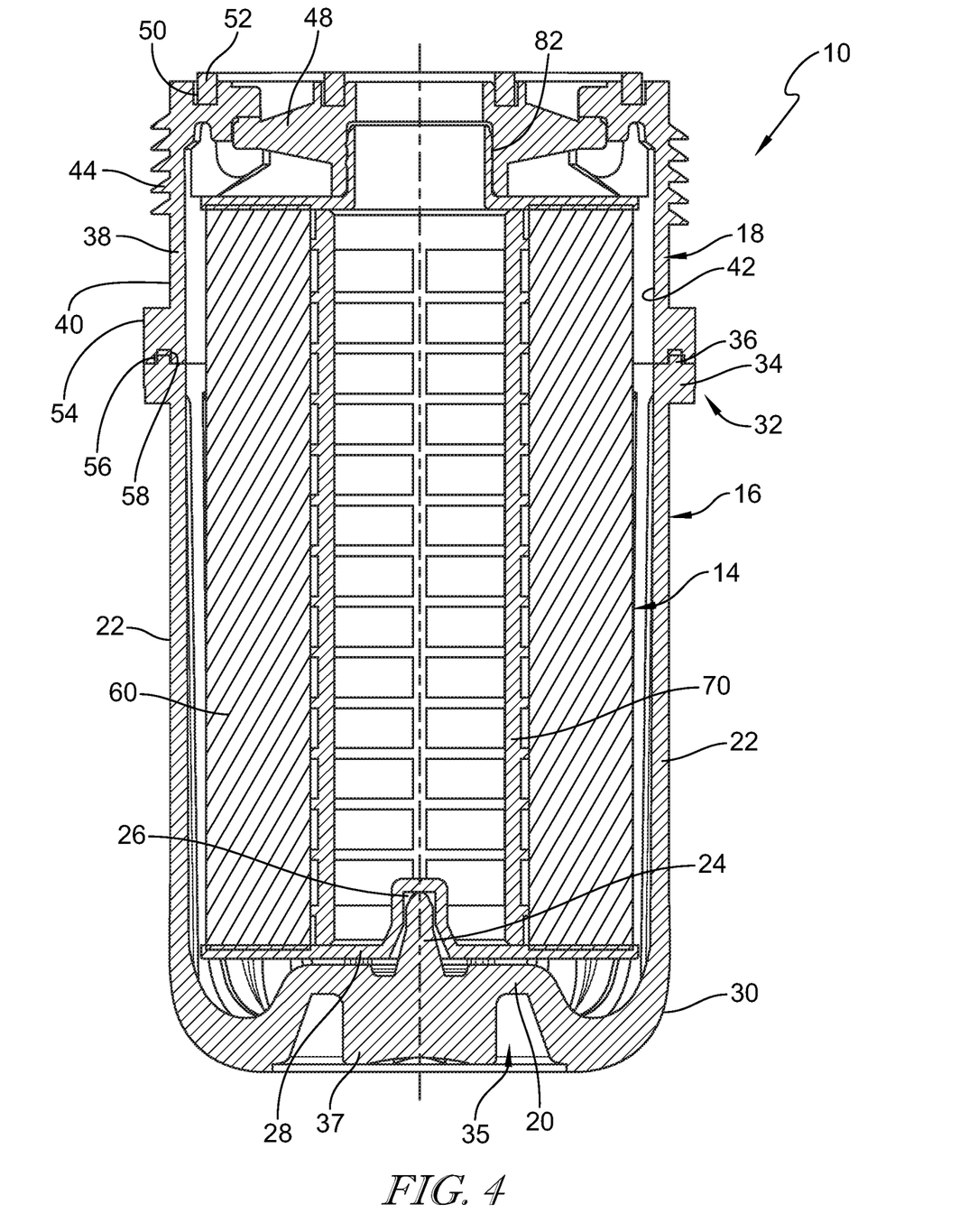
FIG. 4 is a section view taken along line 4-4 of FIG. 1.
Figure 5:
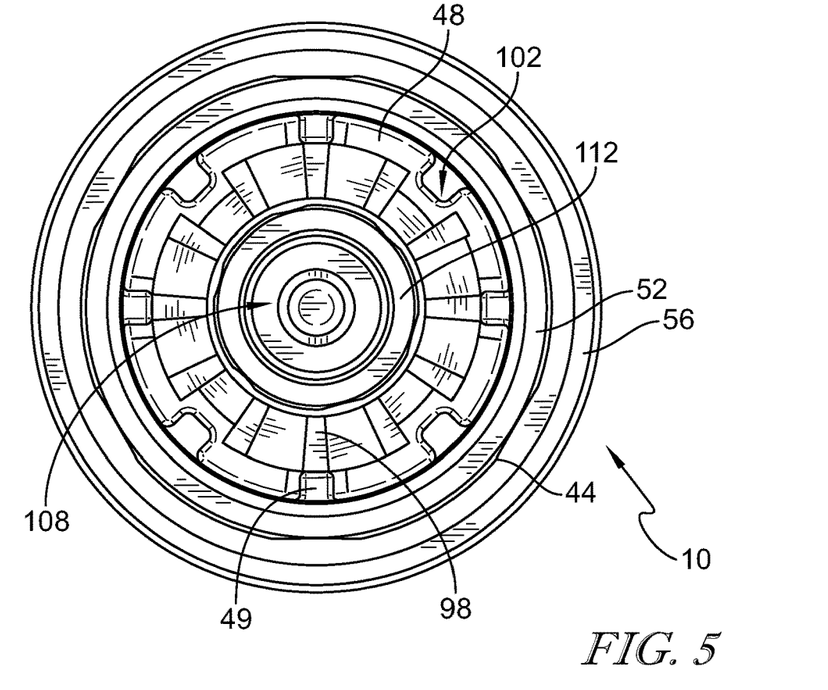
FIG. 5 is a top view of the filter assembly.
Figure 6:
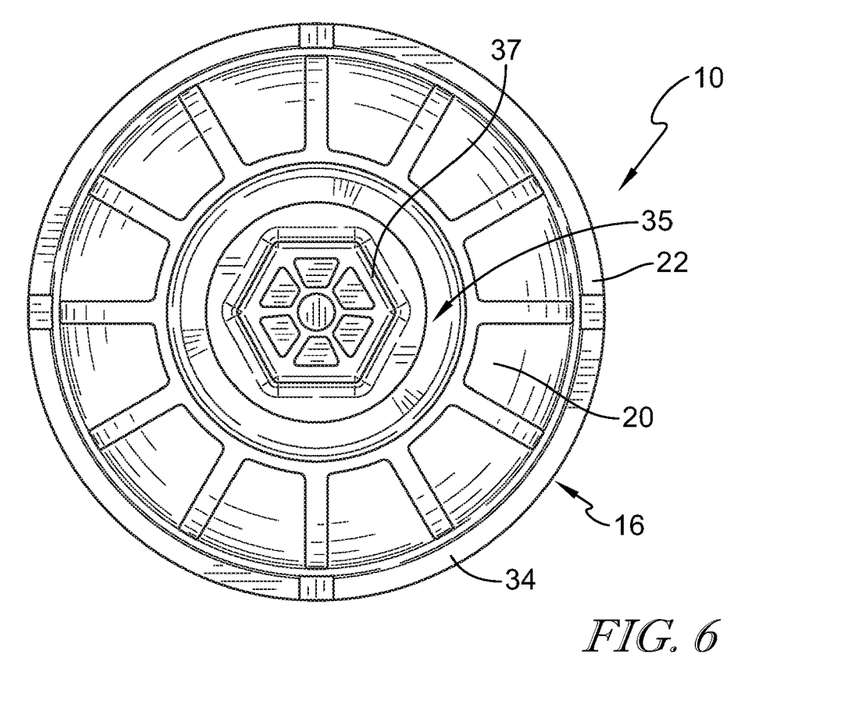
FIG. 6 is a bottom view of the filter assembly.
Figure 7:
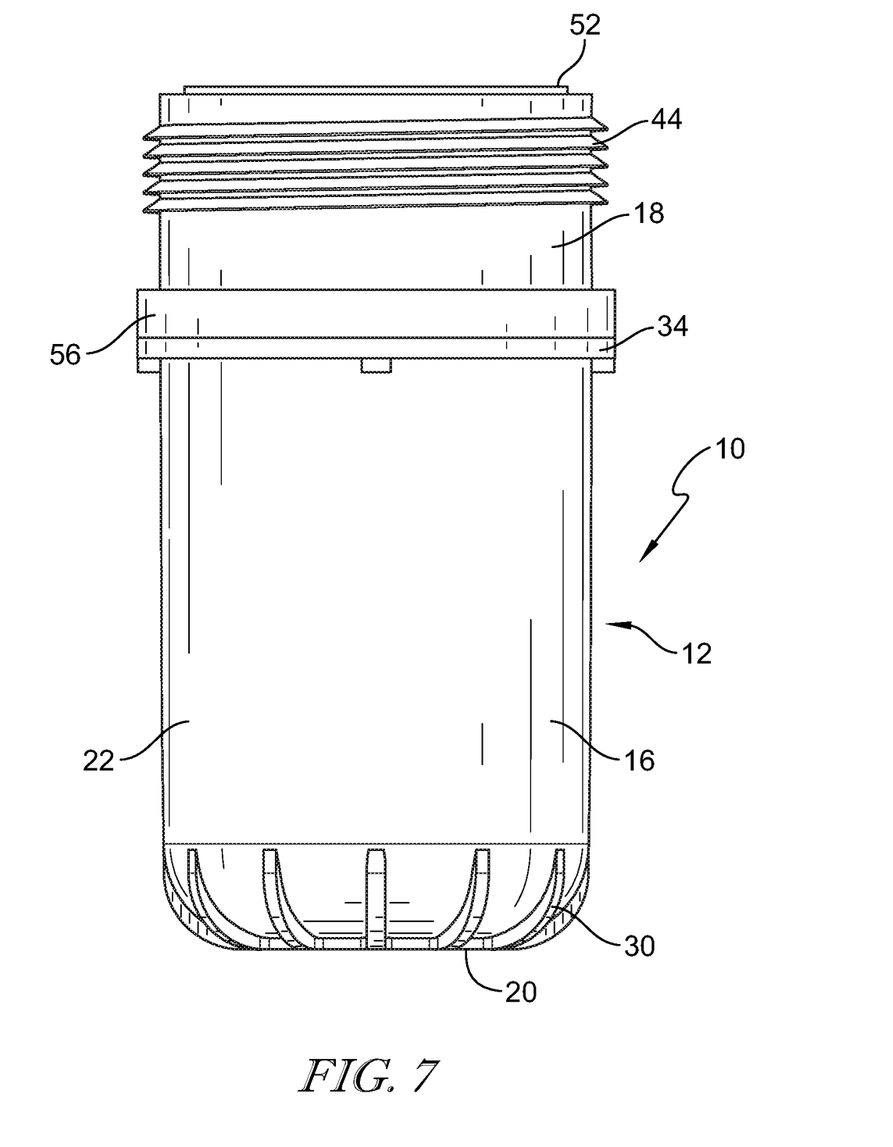
FIG. 7 is a side elevational view of the filter assembly.

Central projection 24 is adapted to engage a recess 26 formed in a first end cap 28 of filter element 14, a shown, for example, in FIG. 4. Central projection 24 acts as a centering pin for filter element 14 when installed into lower housing 16. Lower housing 16 also includes a series of ribs 30 that extend around lower housing 16. Ribs 30 are provided to strengthen lower housing 16 and provide a grip for a user when installing fluid filter assembly 10. Upper end 32 of lower housing 16 includes an annular flange 34 that extends around the perimeter of the lower housing 16. Flange 34 includes an annular rib 36 that projects outwardly from flange 34, as shown in FIG. 3. Bottom wall 20 of lower housing 16 is formed to include a central recess 35, as shown in FIG. 2. Central recess 35 includes a central lug 37, as shown in FIGS. 2 and 4. Central lug 37 is hexagonal shaped, as shown, for example, in FIG. 2. Central lug 37 is adapted to accept a tool, such as a wrench, that allows a user to tighten or loosen the filter 10 with respect to the filter housing (not shown).

Figure 8:
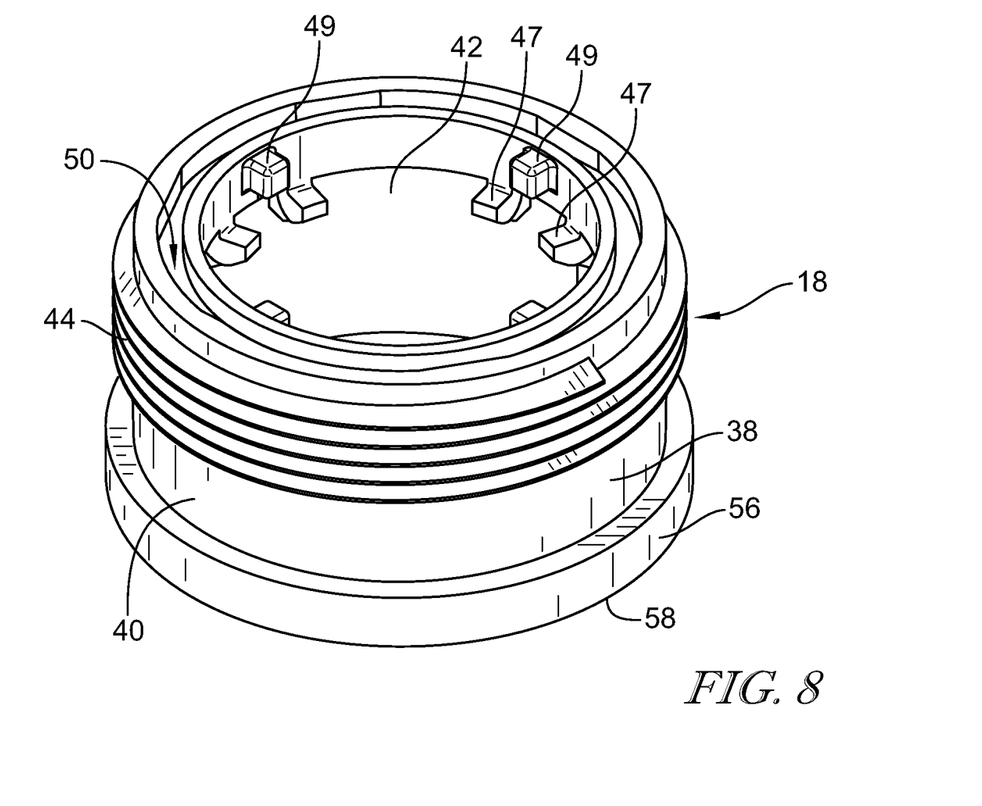
FIG. 8 is a perspective view of the upper housing of the filter assembly.

Upper housing 18 of filter 10 includes an annular side wall 38, as shown in FIGS. 4 and 8. Side wall 38 includes an outer surface 40 and a spaced apart inner surface 42. Outer surface 40 of side wall 38 includes a series of threads 44. Threads 44 allow the filter 10 to be screwed onto a filter head (not shown) having a corresponding thread arrangement.

Inner surface 42 of side wall 38 includes a plurality of lower projections 47 and upper projections 49 that extend radially inwardly from inner surface 42 of side wall 38, as shown in FIG. 8. Projections 47, 49 are spaced apart around the circumference of the side wall 38. Upper projections 49 are spaced axially from lower projections 47. Projections 47, 49 are adapted to secure top plate 48 of the filter 10 to upper housing 18. Top plate 48 is adapted to be positioned within a central bore of upper housing 18 and is positioned between laterally spaced apart lower and upper projections 47, 49.

Upper housing 18 is also formed to include an annular groove 50 in a top surface of the upper housing 18, as shown in FIG. 8. Groove 50 is adapted to accept a seal 52, such as an O-ring, to create a fluid tight seal when the filter 10 is coupled to the filter head. Lower end 54 of upper housing 18 includes an annular flange 56.

Annular flange 56 of upper housing 18 is formed to include an annular groove 58, as shown in FIG. 4. Annular groove 58 is adapted to accept annular rib 36 of lower housing 16 when upper housing 18 is coupled to lower housing 16. Flange 34 of lower housing 16 is coupled to flange 56 of upper housing 18 by spun bonding or use of an adhesive to secure upper housing 18 to lower housing 16. Upper housing 18 and lower housing 16 are secured together after filter element 14 is positioned within cavity of lower housing 16. Upper and lower housings 16, 18 are preferably made from a plastics material such as polypropylene, polyethylene or other plastics material.

Figure 10:
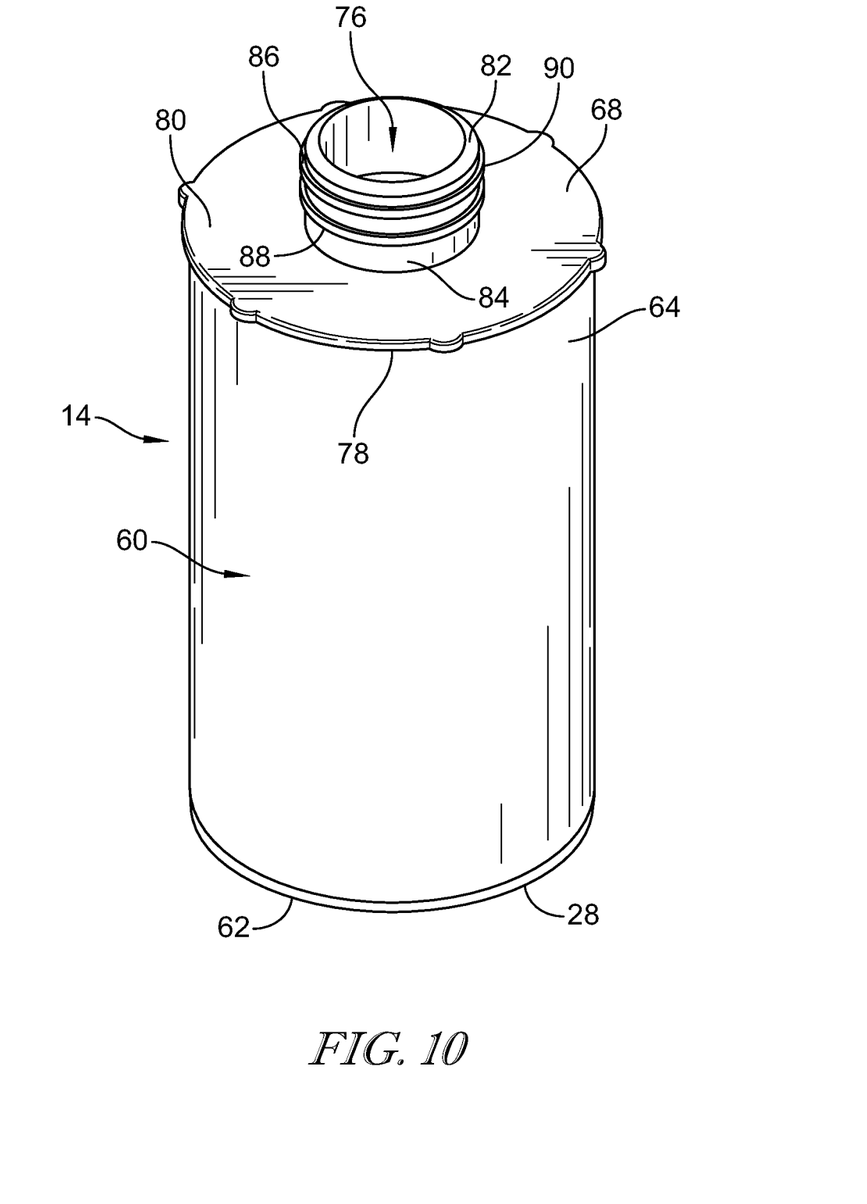
FIG. 10 is a perspective view of the filter element.

Filter element 14 is adapted to be positioned within filter housing 12, as shown in FIGS. 3 and 4. Filter element 14 includes a pleated filter media 60 that has a first end 62 and a spaced apart second end 64, as shown in FIGS. 3 and 10. Filter element 14 includes first end cap 28 secured to the filter media 60 at a first end 62 and a second end cap 68 secured to the filter media 60 at the second end 64. Filter element 14 also includes a core support tube 70. Core support tube 70 is an open structure that includes a series of ribs 72 and openings 74 formed between the ribs 72 to allow for the passage of fluid. Core support tube 70 extends within the center of the filter media 60 from first end cap 28 to second end cap 68 and prevents filter media 60 from collapsing inward during use of the filter 10. First end cap 28 has a generally planar disc shape appearance and is formed to include the central recess 26 that is adapted to accept central projection 24 of the lower housing 16. First end cap 28 is secured to filter element 14 by use of an adhesive or sonic welding.

Second end cap 68 of filter element 14 is a disc shaped member that is formed to include a central opening 76, as shown in FIGS. 3 and 10. Second end cap is secured to the second end 64 of the filter media 60, opposite the first end cap 28 by use of an adhesive or sonic welding. Central opening 76 allows filter fluid to exit the filter 10 that has been filtered by the filter element 14. Second end cap 68 includes a first side 78 that is secured to the filter element 14 and a second side 80 that faces away from the filter element 14.

Second end cap 68 also includes an annular tube 82 that surrounds the central opening 76 formed in the second end cap 68, as shown in FIG. 10. Annular tube 82 extends away from the second side 80 of the second end cap 68. Lower projections 47 of upper housing 18 are adapted to engage second side 80 of second end cap 68. Lower projections 47 secure filter element 14 within housing 12 when upper housing 18 is coupled to lower housing 16 by use of an adhesive or spun welding. Lower projections 47 apply an axial force to second side 80 of second end cap 68 to prevent unwanted axial movement of filter element 14.

Annular tube 82 includes an outer surface 84 that forms the outer perimeter of the annular tube 82, as shown in FIG. 10. Annular tube 82 is formed to include a first annular groove 86 that is formed in the outer surface 84 of the annular tube 82. Annular tube 82 is also formed to include a second annular groove 88 that is formed in the outer surface 84 of the annular tube 82. Second annular groove 88 is axially spaced from the first annular groove 86 along the annular tube 82. Annular tube 82 also includes a first annular seal member 90 and a second annular seal member 92. Seal members 90 and 92, which are preferably O-rings, are adapted to be positioned in the first and second annular groove 86, 88 respectively to seal annular tube 82 to top plate 48.

Lower projections 47 of upper housing 18 put a downward force on the filter element 14 so that that first end cap 28 engages with bottom wall 20 of lower housing 16, as shown in FIG. 4. This prevents unwanted movement of the filter element 14 within the housing 12. Centering projection 24 assists in centering the filter element 14 when the filter element is installed into the lower housing 16.

Filter 10 also includes top plate 48. Top plate 48 includes an outer flange 94 and an inner annular ring 96, as shown, for example, in FIG. 9. Outer flange 94 is connected to the annular ring 96 by use of a series of radially extending bridges 98 that are disposed about annular ring 96. Inlet openings 100 are formed between the bridges 98 that permit fuel or other liquid to enter filter 10.

Figure 9:
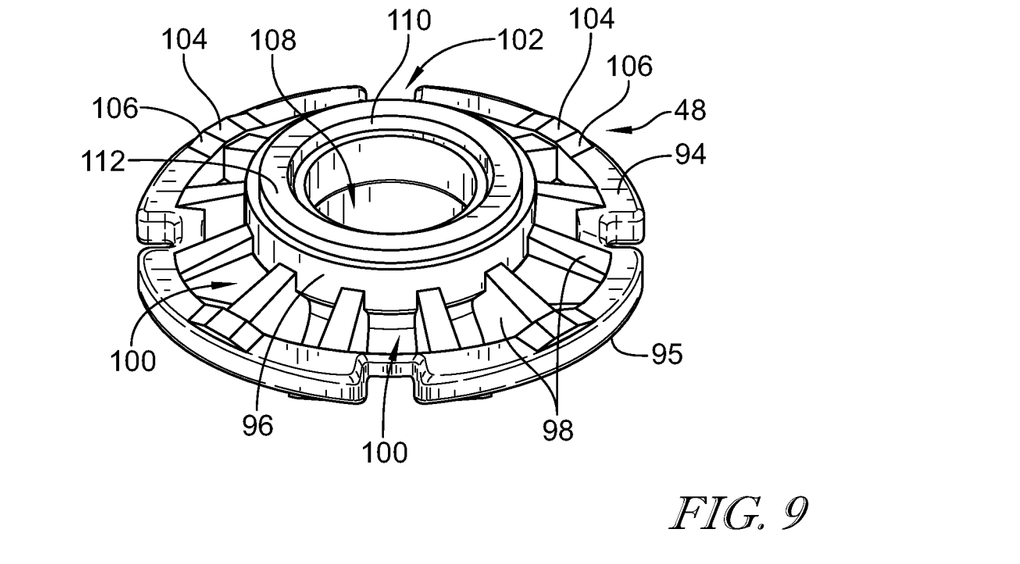
FIG. 9 is a perspective view of the top plate of the filter housing.

Outer flange 94 of top plate 48 is formed to include notches 102 in the outer periphery. The number of notches 102 corresponds to the number of upper projections 49 extending inwardly from upper housing 18. If upper housing 18 includes four upper projections 49 then top plate 48 would include four notches 102 formed in the outer flange 94. This arrangement allows top plate 48 to be installed into upper housing 18 after housing 16 is assembled.

Outer flange 94 of top plate 48 also includes a number of plateaus 104 that extend axially outwardly from the outer flange 94. Plateaus 104 include ramps 106 positioned on both sides of the plateaus 104. To install top plate 48 into upper housing 18, the user aligns notches 102 of top plate 48 with upper projections 49 of upper housing 18 and moves top plate 48 axially towards upper housing 18 so that a bottom surface 95 of outer flange 94 rests upon lower projections 47 of upper housing 18.

Once top plate 48 is resting on lower projections 47 of upper housing 18, the top plate 48 is rotated either clockwise or counterclockwise with respect to the upper housing 18 to cause upper projections 49 to engage and ride up ramps 106 and onto plateaus 104. When upper projections 49 are engaged with plateaus 104, top plate 48 is secured to upper housing 18 as the top plate 48 is wedged between the upper and lower projections 47, 49.

Annular ring 96 of top plate 48 is formed to include a central opening 108 that provides an outlet for cleaned fuel from filter 10, as shown, for example, in FIG. 9. Tube 82 of second end cap 68 of filter element 14 is adapted to be positioned within the central opening 108 of top plate 48 when filter 10 is assembled. First and second seal members 90, 92 are used to form a seal between tube 82 of end cap 68 and top plate 48 to prevent the unwanted leakage of fluid. Annular ring 96 is formed to include an annular groove 110. Annular groove 110 of top plate 48 is adapted to accept a seal member 112. Seal 52 of upper housing 18 and seal member 112 are adapted to engage a filter housing (not shown) to seal the filter 10 with respect to the housing.

In use, fluid cleaned by filter 10 enters the filter 10 through openings 100 in top plate 48 and flow through filter media 60 of filter element 14 from an outside surface of the filter media 60 radially inwardly to inside the filter element 14. Filtered fuel moves axially upwardly and out of central opening 108 of top plate 48. Seal 112 prevents cross contamination between clean and dirty fluid.

To assembly filter 10, filter element 14, with seals 90, 92 installed, and core support tube 70 are first installed in lower housing 16. Once filter element 14 and core support tube 70 are installed in housing 16, upper housing 18 is coupled to lower housing 16. Once upper and lower housings 16, 18 are coupled together, top plate 48 is installed onto upper housing 18 to finish assembly of the filter.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A filter assembly for filtering a fluid comprising:
   a housing having a side wall and a bottom wall to define an inner cavity, the housing having an interior surface;
   a filter element positioned within the cavity of the housing, the filter element adapted to filter a fluid;
   a plurality of first projections extending radially inwardly from the interior surface of the housing;
   a plurality of second projections extending radially inwardly from the interior surface of the housing, the second projections being axially spaced from the first projections;
   a top plate adapted to be coupled to the housing, the top plate adapted to be positioned between the first and second projections such that a first surface of the top plate engages the first projections and a second surface of the top plate engages the second projections, wherein the top plate includes an outer perimeter that includes a plurality of notches;
   wherein the first and second projections maintain the axial position of the top plate with respect to the housing.

2. The filter assembly of claim 1, wherein the number of notches is equal to the number of second projections.

3. The filter assembly of claim 2, wherein the notches are adapted to allow the top plate to move axially past the second projections toward the first projections.

4. The filter assembly of claim 1, wherein the second surface of the top plate includes a ramped surface that connects the second surface to a third surface.

5. The filter assembly of claim 4, wherein when the top plate is positioned between the first and second projections and is rotated, the ramp surface engages one of the second projections and continued rotation causes the third surface to engage the one of the second projections to lock the position of the top plate between the first and second projections.

6. The filter assembly of claim 1, wherein the top plate includes an inner annular ring that is formed to include a central opening.

7. The filter assembly of claim 6, wherein the inner annular ring is connected to an outer flange by a series of radially extending bridge members.

8. The filter assembly of claim 7, wherein the top plate is formed to include openings between the bridge members.

9. The filter assembly of claim 6, wherein the inner annular ring includes a gasket used to form a seal.

10. The filter assembly of claim 1, wherein the filter housing includes a first housing component and a second housing component that is connected to the first housing component to form the cavity within the housing.

11. A filter assembly for filtering a fluid comprising:
    a housing having a side wall and a bottom wall to define an inner cavity, the housing having an interior surface;
    a filter element positioned within the cavity of the housing, the filter element adapted to filter a fluid;
    a plurality of first projections extending radially inwardly from the interior surface of the housing;
    a plurality of second projections extending radially inwardly from the interior surface of the housing, the second projections being axially spaced from the first projections;
    a top plate having a perimeter formed to include a plurality of notches, the top plate adapted to be positioned between the first and second projections such that a first surface of the top plate engages the first projections and a second surface of the top plate engages the second projections.

12. The filter assembly of claim 11, wherein the number of notches is equal to the number of second projections.

13. The filter assembly of claim 12, wherein the notches are adapted to allow the top plate to move axially past the second projections toward the first projections.

14. The filter assembly of claim 11, wherein the second surface of the top plate includes a ramped surface that connects the second surface to a third surface.

15. The filter assembly of claim 14, wherein when the top plate is positioned between the first and second projections and is rotated, the ramp surface engages one of the second projections and continued rotation causes the third surface to engage the one of the second projections to lock the position of the top plate between the first and second projections.

16. The filter assembly of claim 15, wherein the first projections engage the filter element to assist in maintaining axial position of the filter element with respect to the housing.

17. The filter assembly of claim 11, wherein the top plate includes a central opening.

18. The filter assembly of claim 17, wherein the filter element includes a tubular member that is adapted to be positioned within the central opening of the top plate when the filter assembly is assembled.

19. The filter assembly of claim 18, wherein the tubular member includes a seal member to form a seal between the tubular member and the top plate.

20. A filter assembly for filtering a fluid comprising:
    a housing having a side wall and a bottom wall to define an inner cavity, the housing having an interior surface;

a filter element positioned within the cavity of the housing, the filter element adapted to filter a fluid;
a plurality of first projections extending radially inwardly from the interior surface of the housing;
a plurality of second projections extending radially inwardly from the interior surface of the housing, the second projections being axially spaced from the first projections;
a top plate adapted to be coupled to the housing, the top plate adapted to be positioned between the first and second projections such that a first surface of the top plate engages the first projections and a second surface of the top plate engages the second projections, wherein the second surface of the top plate includes a ramped surface that connects the second surface to a third surface;
wherein when the top plate is positioned between the first and second projections and is rotated, the ramp surface engages one of the second projections and continued rotation causes the third surface to engage the one of the second projections to lock the position of the top plate between the first and second projections;
wherein the first and second projections maintain the axial position of the top plate with respect to the housing.

\* \* \* \* \*